Figure 1:
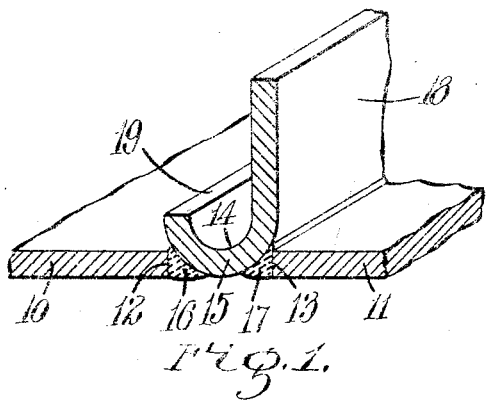

June 24, 1941.  E. H. EWERTZ  2,246,579

BUTT STRAP FOR WELDED JOINTS

Filed June 4, 1938

Inventor:
Eric H. Ewertz.
by Franklin E. Low.
Att'y.

Patented June 24, 1941

2,246,579

UNITED STATES PATENT OFFICE 2,246,579

BUTT STRAP FOR WELDED JOINTS

Eric H. Ewertz, Elizabeth, N. J.

Application June 4, 1938, Serial No. 211,958

3 Claims. (Cl. 189—36)

This invention relates broadly to improvements in welded joints, and particularly to stress relieving butt straps therefor.

In welding together the edges of adjacent plates, as for example those provided for the hulls of boats, or for tanks and other structures having plates embodied therein, severe stresses are set up either in the welded joints or in the plates adjacent to the welds. If the plates are not free to move there is danger of rupture in either the welds or the plates caused by the cooling or contracting stresses, in which case the joint is liable to failure.

The primary object of this invention is to provide a butt strap of novel construction and adapted to be interposed between the edges of adjacent plates to be welded, said strap being constructed and arranged to move in a manner to increase the spread between its opposite longitudinal edges, and also being free to provide for longitudinal contraction as the weld progresses, all in such a manner that the welded joint is permitted to cool without setting up any contracting stresses which might tend to fracture either the joint or plates.

Another object of the invention is to provide a butt strap having a portion embodied therein which is substantially arcuate in cross sectional contour, and which upon being welded between the edges of adjacent plates constitutes a reinforcement for the structure as a whole, the strap in certain instances and in certain structures having a leg or legs embodied therein which constitute flanges and provide a still greater reinforcement for the joint and for the structure as a whole.

The invention consists of a butt strap and welded joint as set forth in the following specification and particularly as pointed out in the claims.

Referring to the drawing:

Fig. 1 is a sectional perspective view illustrating a welded joint having a butt strap of my invention embodied therein.

Figs. 2 to 8 inclusive are sectional views illustrating welded joints having butt straps embodied therein which are formed in accordance with the principles of my invention.

Like numerals refer to like parts throughout the several views of the drawing.

In the drawing, referring particularly to Fig. 1, 10 and 11 represent oppositely disposed plates spaced apart one from another and positioned in edge to edge alignment one with another. Interposed in the space between opposite edge portions 12 and 13 of the plates 10 and 11 respectively is a stress relieving butt strap 14 formed in accordance with the teachings of this invention, said butt strap being of J shaped formation and having an arcuate bent portion 15 embodied therein which extends longitudinally thereof and of which the arcuate surface of greater radius is positioned between said edge portions 12 and 13 and is welded thereto at 16 and 17 respectively by closely juxtaposed welds, and the planes of the inner and outer surfaces of the plates being substantially tangent to the inner and outer arcs respectively of the bent or arcuate portion of the butt strap.

The butt strap 14 is provided with legs or flanges 18 and 19 of different widths at opposite sides of the arcuate portion 15, and said flanges reinforce the welded joint and the structure as a whole. It is evident that the flanges 18 and 19 may be of any width that may be considered desirable to reinforce the joint, the width being determined by the type of structure of which the joint forms a part. The butt strap 14 is positioned with the median line thereof perpendicular to the face of the plates, and during the cooling of the joint and plates the contracting stresses are set up in a direction approximately radial to the arc of curvature of the arcuate portion of the butt strap and said strap is free to move, opening up laterally and increasing the spread between the flanges thereof, and also being free to shrink as the welding progresses, and the welded joint is thereby permitted to cool without setting up any contracting stresses which can injure either the joint or plate. In addition, the welded joint is greatly strengthened by the legs or flanges 18 and 19 which also strengthen the entire structure.

Figure 2:
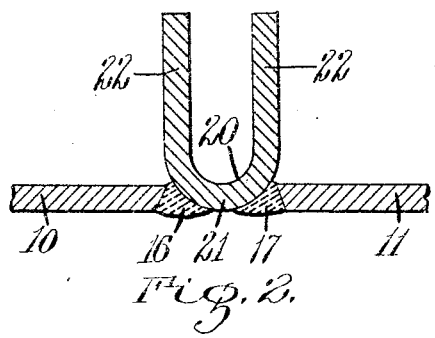

In Fig. 2 I have illustrated a modified embodiment of my invention in which plates 10 and 11 are secured together by a U shaped butt strap 20 having an arcuate intermediate portion 21 embodied therein which is interposed between opposite bevelled edge portions of said plates and welded thereto at 16 and 17 respectively. The butt strap 20 is provided with legs or flanges 22 of equal width extending substantially parallel to each other, and during the cooling of the joint said flanges may spread to relieve the contracting stresses and the strap is free to shrink as the welding progresses.

Figure 3:
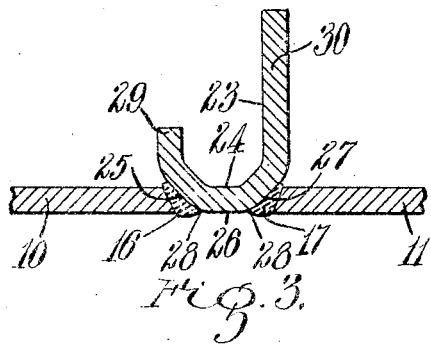

In Fig. 3 another modified embodiment of my invention is illustrated in which plates 10 and 11, which may have bevelled edge portions if so desired, are secured together by a butt strap 23 having a substantially arcuate intermediate portion 24 embodied therein which is welded to said plates at 16 and 17 by closely juxtaposed welds. The portion 24 is flattened slightly at 25, 26 and 27, and said flattened portions are connected one to another by short arcuate portions 28. The strap 23 is provided with flanges 29 and 30 of different widths at opposite sides of the arcuate portion 24, and said flanges may spread during the cooling of the joint to relieve the contracting stresses which are set up in a direction perpendicular to the flat portions 25 and 27 of the butt strap and the strap is free to shrink as the welding progresses.

Figure 4:
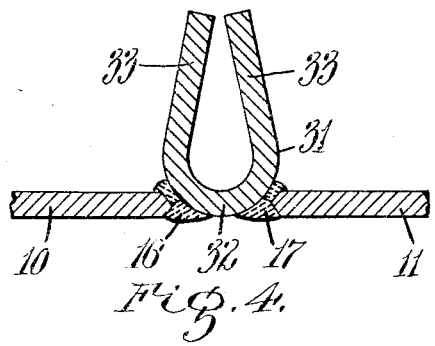

In Fig. 4 still another welded joint is illustrated in which plates 10 and 11 having edge portions which may or may not be bevelled as desired are secured together by means of a butt strap 31 having an arcuate intermediate portion 32 embodied therein which is interposed between said plates and welded thereto at 16 and 17. In this embodiment of the invention flanges 33 of equal width are inclined toward each other and said flanges may spread during cooling of the joint to relieve the contracting stresses.

Figure 5:
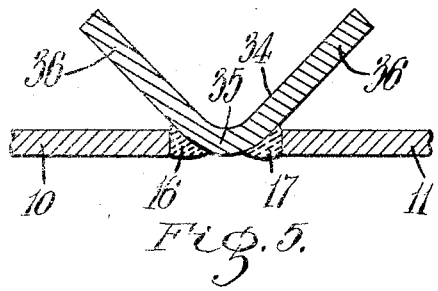

In Fig. 5 a welded joint is illustrated having a V shaped butt strap 34 embodied therein formed in accordance with the teachings of this invention. The strap 34 has an arcuate intermediate portion 35 embodied therein which is welded to the plates 10 and 11 at 16 and 17 respectively, and flanges 36 of equal width formed as extensions of said arcuate portion are positioned perpendicular to each other and are inclined with respect to the plates 10 and 11. The action of the joint is to cause the flanges to spread and thereby relieve the stresses set up during the cooling of the joint.

Figure 6:
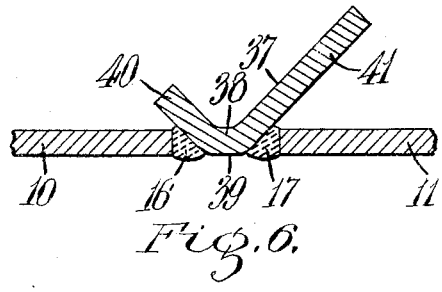

In Fig. 6 another welded joint is illustrated having a butt strap 37 embodied therein provided with an arcuate intermediate portion 38 which is flattened slightly at 39. In this embodiment of the invention flanges 40 and 41 of different widths are positioned perpendicular to each other and in inclined relation to the plates 10 and 11, and said flanges may spread during the cooling of the joint and plates to relieve the contracting stresses.

Figure 7:
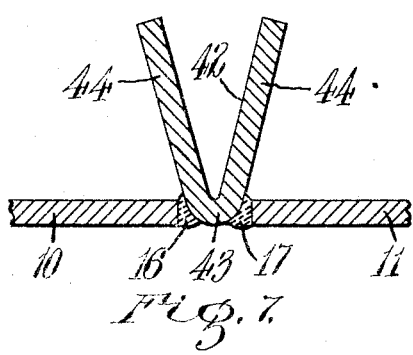

In Fig. 7 another V shaped butt strap 42 is illustrated provided with an arcuate intermediate portion 43 and having flanges 44 of equal width embodied therein which are positioned at an acute angle to each other, and said flanges may move toward each other during the cooling of the joint.

Figure 8:
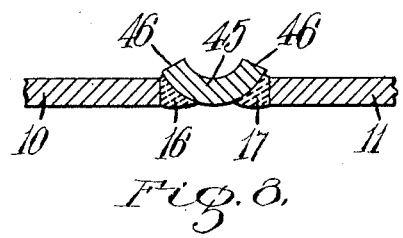

In Fig. 8 an arcuate butt strap 45 is interposed between the edge portions 12 and 13 of plates 10 and 11 respectively. The strap has no flanges but is of sufficient width and curvature to permit opposite edge portions 46 thereof to spread to relieve contracting stresses.

All of the various embodiments of this invention herein illustrated and described function in the same manner to relieve contracting stresses, and in each case the strap is free to shrink as the welding progresses. The flanges, furthermore, in each case increase the strength of the joint and the structure as a whole.

In the several views of the drawing the plates 10 and 11 are illustrated as having opposite adjacent edges which in certain instances are parallel to each other and which in other instances are bevelled at various angles to the faces of the plates, and it is evident that any of the various types of edges illustrated may be provided for the plates as may be best suited for the particular form of butt strap utilized. It is still further evident that the various joints may be welded from either or both faces of the plates as may be best suited for the type of butt strap employed and the particular structure in which the joint is utilized.

The butt straps of this invention are particularly valuable in securing the plates of certain structures together, particularly the plates of ships using welded fastenings. The plates may be bolted in place at the openings between their respective edges and held until the plates are welded to a supporting framework. With the plates thus held the arcuate straps of the invention are inserted between the edges of the plates and welded thereto by closely juxtaposed welds with the result that during the cooling of the welded joint and plate the movement of the butt strap is sufficient to relieve the contracting stresses which may be set up.

In each of the embodiments of this invention the planes of the inner and outer surfaces of the plates are substantially tangent to the inner and outer arcs respectively of the bent or arcuate portion of the butt strap.

I claim:

1. The combination with plates spaced apart edge to edge, of a butt strap having a continuous arcuate intermediate portion embodied therein of which the arcuate surface of greater radius is positioned between said edges and welded thereto, and the planes of the inner and outer surfaces of the plates being substantially tangent to the inner and outer arcs of the intermediate portion of the butt strap.

2. The combination with plates spaced apart edge to edge, of a butt strap having an arcuate bent portion embodied therein of which the outer surface is positioned between said edges and secured thereto by closely juxtaposed welds, the planes of the inner and outer surfaces of the plates being substantially tangent to the inner and outer arcs of the arcuate portion and opposite extremities of said butt strap being free to spread relatively to each other to relieve stress in the welds.

3. The combination with plates spaced apart edge to edge, of a butt strap having an arcuate intermediate portion embodied therein of which the surface of greater radius is positioned between said edges and secured thereto by closely juxtaposed welds, the planes of the inner and outer surfaces of the plates being substantially tangent to the inner and outer arcs of the intermediate portion of the butt strap, and opposite extremities of said butt strap being extended and terminating in reinforcing flanges which are free to spread relatively to each other to relieve stress in the welds.

ERIC H. EWERTZ.